United States Patent
Nair et al.

(10) Patent No.: US 9,930,717 B2
(45) Date of Patent: Mar. 27, 2018

(54) INTERMITTENT OUT OF SERVICE RECOVERY ON ACCESSORY DEVICE

(71) Applicant: Apple Inc., Cupertino, CA (US)

(72) Inventors: Sindhu Sivasankaran Nair, Walnut Creek, CA (US); Tahir Shamim, San Jose, CA (US); Gaurav Arya, San Jose, CA (US); Thanigaivelu Elangovan, Santa Clara, CA (US); Lakshmi N. Kavuri, San Jose, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 15/174,555

(22) Filed: Jun. 6, 2016

(65) Prior Publication Data

US 2017/0353990 A1    Dec. 7, 2017

(51) Int. Cl.
*H04W 76/02* (2009.01)
*H04W 8/00* (2009.01)

(52) U.S. Cl.
CPC .......... *H04W 76/028* (2013.01); *H04W 8/005* (2013.01)

(58) Field of Classification Search
CPC .......................... H04W 76/0028; H04W 8/005
USPC ....................................................... 455/41.2
See application file for complete search history.

(56) References Cited

U.S. PATENT DOCUMENTS

| | | | |
|---|---|---|---|
| 7,570,951 B2 | 8/2009 | Classon et al. | |
| 8,654,644 B2 | 2/2014 | Sundell et al. | |
| 8,706,131 B2 | 4/2014 | Winters | |
| 9,167,524 B2 | 10/2015 | Nikiforov | |
| 9,369,953 B2 | 6/2016 | Ekici et al. | |
| 2002/0128014 A1* | 9/2002 | Chen ..................... | H04W 16/10 455/447 |
| 2011/0195712 A1* | 8/2011 | Mucke ................... | H04W 48/16 455/434 |
| 2012/0214526 A1* | 8/2012 | Selen ..................... | H04W 48/16 455/507 |
| 2014/0105086 A1* | 4/2014 | Chhabra ........... | H04W 52/0254 370/311 |
| 2015/0038143 A1 | 2/2015 | Kilpatrick et al. | |
| 2016/0034823 A1 | 2/2016 | Farkas et al. | |

FOREIGN PATENT DOCUMENTS

WO     WO15120625      8/2015

OTHER PUBLICATIONS

Donohoo, Brad Kyoshi; Machine Learning Techniques for Energy Optimization in Mobile Embedded Systems; Master's Thesis; Summer 2012; 284 pages; Colorado State University, Department of Electrical and Computer Engineering.

* cited by examiner

*Primary Examiner* — Marisol Figueroa
(74) *Attorney, Agent, or Firm* — Meyertons Hood Kivlin Kowert & Goetzel, P.C.; Jeffrey C. Hood; Joel L. Stevens

(57) ABSTRACT

This disclosure relates to out of service recovery techniques for an accessory device. According to some embodiments, the accessory device may receive cellular communication system selection information from a paired device. The accessory device may store the communication system selection information. At some point, it may be determined that the accessory device has lost cellular communication service. The accessory device may perform a cellular communication service scan utilizing the system selection information received from the paired device along with its own historical information and location based frequency lists.

24 Claims, 3 Drawing Sheets

INTERMITTENT OUT OF SERVICE RECOVERY ON ACCESSORY DEVICE

TECHNICAL FIELD

The present application relates to wireless communication, including to techniques for an accessory device to recover from intermittent out of service conditions.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices. Therefore, improvements in the field are desired.

SUMMARY

Embodiments are presented herein of, inter alia, systems, apparatuses, and methods for an accessory device to recover from intermittent out of service conditions.

According to the techniques described herein, an accessory device may pair with another device (that may be referred to as a "second device" or "paired device"). This may include establishing a pairing relationship using a short range communication technology such as Bluetooth, Wi-Fi peer-to-peer, near field communication (NFC), etc.

The paired device may provide (e.g., via the short range communication technology) cellular communication system selection information to the accessory device. The cellular communication system selection information may include information found and/or used during cellular communication system selection by the paired device, such as any or all of a current cell ID of a cell on which the paired device is camped, a radio access technology with which the paired device is camping on the cell, a list of frequencies on which the paired device has been able to detect cellular communication system information, a list of frequencies on which neighboring cells to the current cell on which the paired device is camped are deployed, a public land mobile network on which the paired device is currently (or most recently was) registered, a list of candidate cellular communication system frequencies associated with a current location of the paired device, and/or any of various other types of information.

The accessory device may utilize the cellular communication system selection information from the paired device as part of a cellular communication service scan if and when the accessory device loses cellular communication service, potentially including times when the pairing with the paired device is also lost (e.g., if the accessory device is taken on a run or hike without the paired device, among various possible reasons).

In some instances, the accessory device may filter some or all of the cellular communication system selection information based on characteristics of the accessory device that differ from the paired device prior to utilizing the information as part of its cellular communication service scan. For example, if the accessory device has a less sensitive antenna arrangement than the paired device, a (e.g., relatively high) signal strength threshold associated with the accessory device may be used to filter out frequencies on which cellular communication system information was detected by the paired device with signal strength below the signal strength threshold associated with the accessory device from being scanned as part of the cellular communication service scan (e.g., at least initially), as one possibility.

In some instances, the location and/or motion state of the accessory device may also or alternatively be considered as part of a cellular communication service scan when out-of-service. For example, the accessory device may determine its location, determine a set of candidate cellular communication system frequencies associated with its current location, and perform the cellular communication service scan based at least in part on that set of candidate cellular communication system frequencies. One or more filters based on characteristics of the accessory device, subscription characteristics, etc., may also be applied to the location based set of frequencies. According to some embodiments, a length of time for which the location based set of frequencies is considered valid may be determined based at least in part on the motion state of the accessory device. For example, location information for a rapidly moving accessory device may become stale more quickly than a slowly moving or stationary accessory device.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
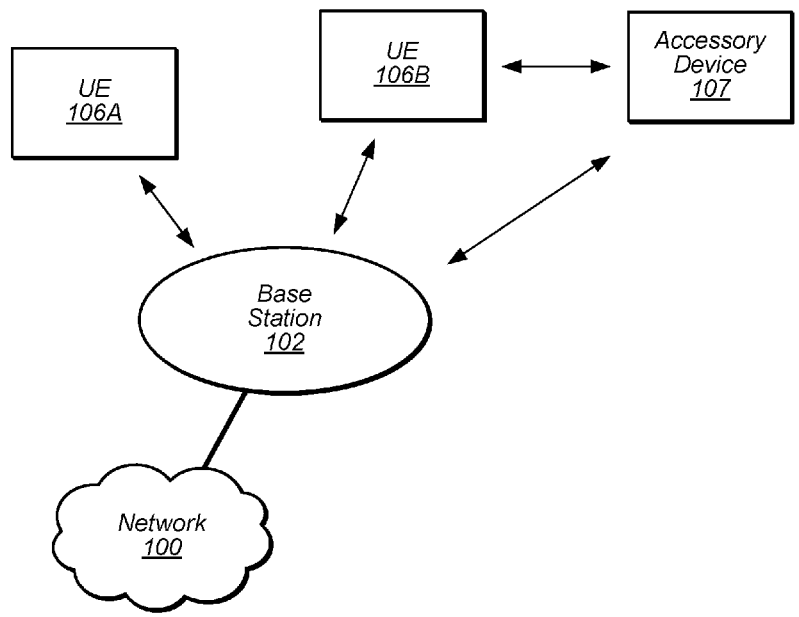
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. §112(f) for that unit/circuit/component.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device, or any type of communication device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

Figure 2:
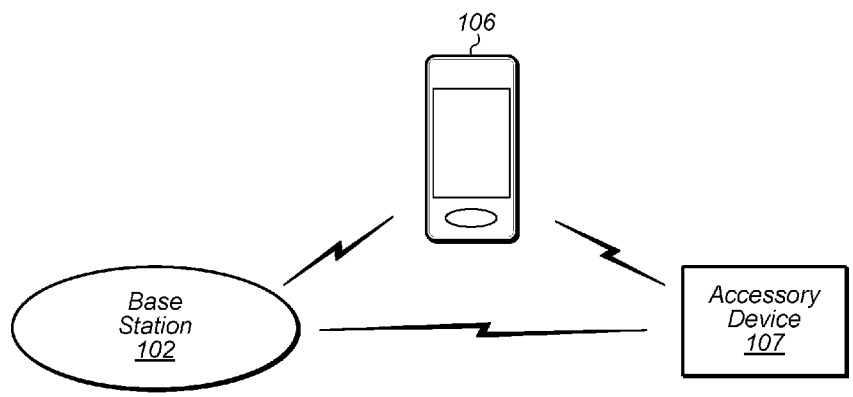
FIG. 2 illustrates an example system where an accessory device can selectively either directly communicate with a cellular base station or utilize the cellular capabilities of an intermediate or proxy device such as a smart phone, according to some embodiments.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
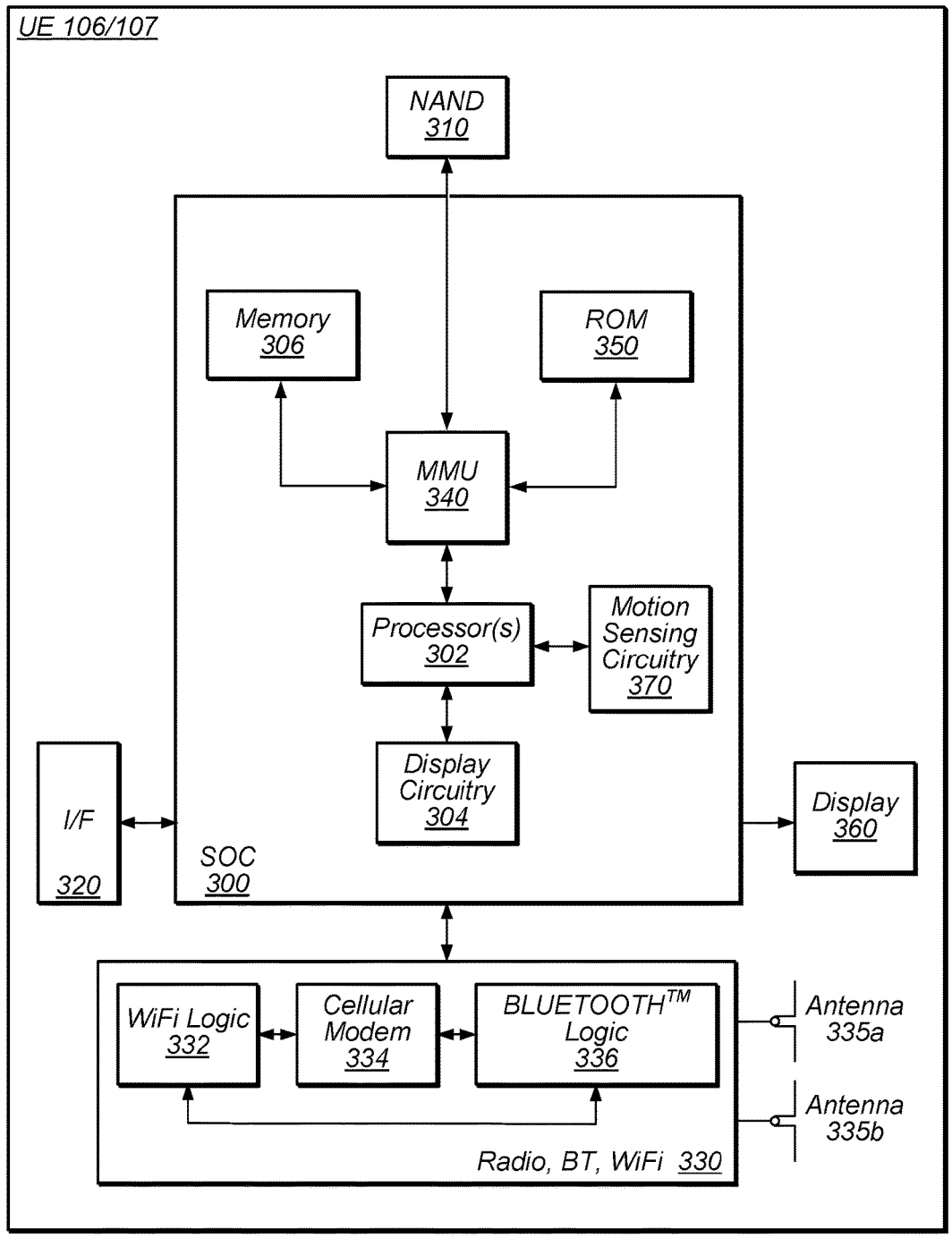
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., Wi-Fi logic 332, cellular modem 334, BT logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
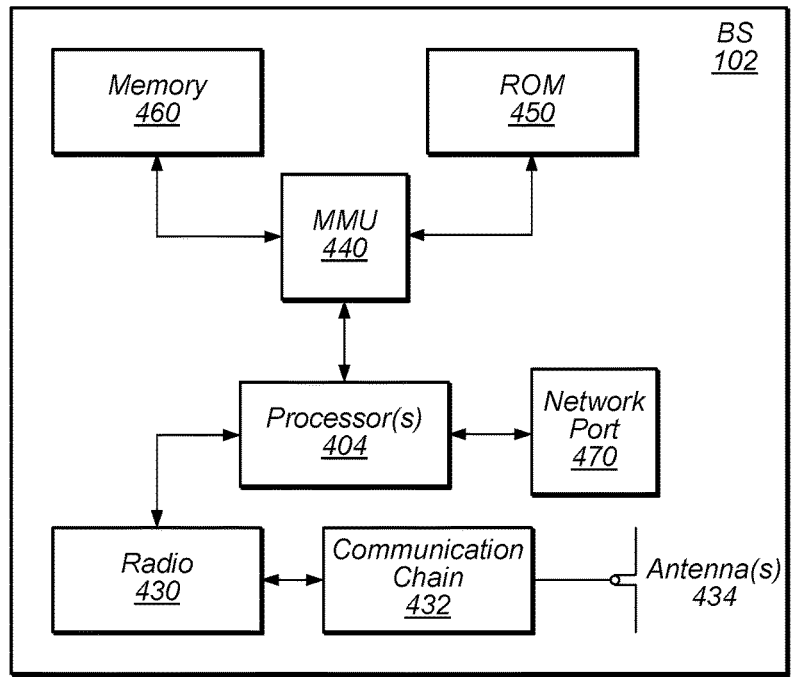
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

FIG. 5—Flowchart

Figure 5:
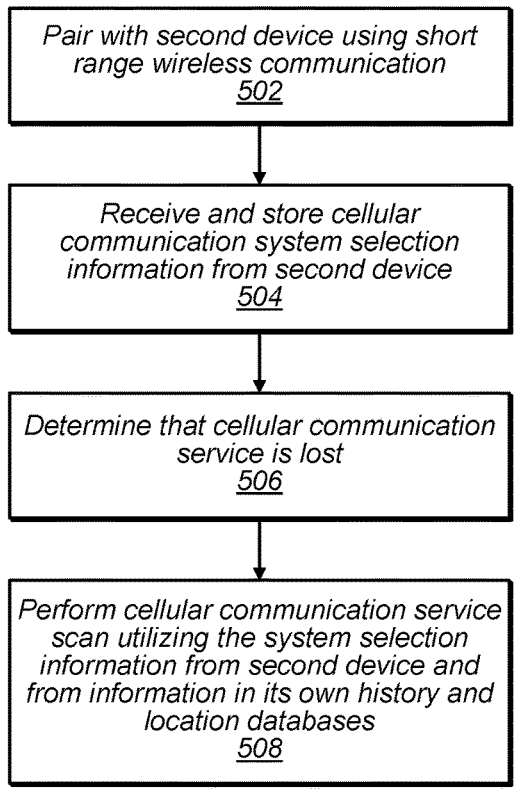
FIG. 5 is a flowchart diagram illustrating an exemplary method for out of service recovery by an accessory device, according to some embodiments.

FIG. 5 is a flowchart diagram illustrating a method for an accessory device to recover from out of service conditions, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as a UE 106 or 107 illustrated in and described with respect to FIGS. 1-3, or more generally in conjunction with any of the computer systems or devices shown in the above Figures, among other devices, as desired. As shown, the method may operate as follows.

In 502, an accessory device may pair with another ("second" or "paired") device using one or more short range wireless communication technologies. Pairing the accessory device with the second device may create a link between the devices such that the devices may be able to wirelessly communicate when within communication range of one another. According to some embodiments, a paired relationship between devices may optionally additionally include or enable one or more further characteristics, such as any or all of one or more shared settings, user profiles and/or accounts, data synchronization between the devices, etc.

The accessory device and the second device may be capable of communicating with each other using any or all of Bluetooth, Wi-Fi, near field communication (NFC), and/or any of various other possible short range communication protocols, according to some embodiments. Additionally, each of the accessory device and the second device may be capable of performing cellular communication, according to some embodiments.

Although each of the accessory device and the second device may be capable of communicating according to multiple wireless communication technologies, at least according to some embodiments, the accessory device may have different characteristics than the second device that may affect their respective preferred usage patterns and relationships. For example, as one possibility, the accessory device might be a smart watch or other wearable device, while the second device might be a smart phone, and the accessory device might have more limited battery capacity and degraded antenna performance relative to the second device.

In accordance with such potentially differing characteristics, it may (at least some of the time) be desirable for the accessory device to utilize the cellular service communication capabilities of the second device when available instead of performing cellular communication directly, and/or to obtain assistance from the second device to facilitate acquisition of cellular service by the accessory device. Furthermore, it may be desirable to prepare in advance for possible scenarios when the accessory device may temporarily lose cellular service and/or the pairing connection with the second device, such as if a user of the accessory device brings the accessory device along with them (e.g., on a run, hike, etc.) while leaving the second device behind (e.g., at home).

Accordingly, in 504, the accessory device may receive (e.g., using a short range wireless communication technology) cellular communication system selection information from the second device, and may store the received information. The cellular communication system selection information may include any or all of various possible types of information available at the second device that may be of assistance to the accessory device in discovering, acquiring, and/or attaching to a cell from which cellular service may be obtained. For example, the cellular communication system selection information may include indications of any or all of a cell identifier, frequency, and/or RAT of a cell on which the second device is currently (or was most recently) camped, a list of neighboring cells to the serving cell of the second device (e.g., potentially including inter-frequency and/or intra-frequency neighboring cells operating according to the same or a different RAT (e.g., LTE, WCDMA, etc.) as the serving cell), a list of frequencies on which the second device has detected cellular system information (possibly including one or more characteristics, such as signal strength, of those systems detected), a list of candidate cellular system frequencies associated with a location of the second device, a public land mobile network (PLMN) on which the second device is currently (or was most recently) registered (e.g., a RPLMN of the second device), and/or any of various other kinds of information, as desired.

According to some embodiments, the second device may occasionally provide updated cellular communication system selection information to the accessory device while they are paired, e.g., in order to ensure that the accessory device has the most recent cellular communication system selection information available from the second device. Note that if desired, such data transfers may be performed opportunistically and/or as background activities (e.g., after the accessory device and the second device are already active and/or communicating, such as in response to user activity), which may help conserve battery power at one or both of the accessory device and the second device. Such updates may be performed at any of various possible (e.g., approximate or precise) periodicities, such as once per week, once per day, once per hour, once per five minutes, etc. As another (alternative or additional) possibility, updated cellular communication system selection information may be provided to the accessory device in response to a triggering event, such as an initial pairing between the accessory device and the second device, a user request, an upcoming scheduled event (e.g., a 'run', 'hike', or other activity determined to increase a likelihood of the accessory device and the second device temporarily losing their pairing) stored in one or both of the accessory device or the second device, etc.

In 506, the accessory device may determine that it has lost cellular communication service. For example, the signal strength of a cell to which the accessory device had been attached may have decreased (e.g., due to movement of the accessory device away from the cell, increased interference, etc.) such that the accessory device is no longer able to communicate with the base station providing the cell, and the accessory device may not be aware of any suitable neighboring cells. According to some embodiments, the accessory device may also have lost its pairing with the second device. For example, as previously discussed, the accessory device may be transported (e.g., on a jog, hike, bike ride, etc.) beyond communication range of the second device.

In 508, the accessory device may attempt to regain cellular communication service. As part of its attempt to regain cellular communication service, the accessory device may utilize the cellular communication system selection information received from the second device, e.g., in addition to cellular communication system selection history and location data from the accessory device. For example, the accessory device may perform a cellular communication service scan of one or more frequencies on which one or more cells may be deployed based at least in part on the cellular communication system selection information received from the second device, e.g., including some or all frequencies from an acquisition list (cells for which system information has previously been detected) and/or a neighbor list (cells indicated to be neighbor cells to the serving cell) for each of the accessory device and/or the second device. Such a cellular communication service scan may include scanning one or more frequencies (e.g., identified by absolute radio frequency channel number (ARFCN) or enhanced ARFCN (EARFCN)) to determine if a cellular system is present at each scanned frequency, and (at least in some instances) attempting to acquire system information and potentially attaching to a cell if such acquisition of system information for the cell is successful.

As previously noted, at least according to some embodiments, the cellular communication system selection information may include an indication of possible candidate frequencies associated with a location of the second device. Additionally or alternatively, the accessory device may have location-based information indicating possible candidate frequencies associated with one or more locations or regions stored locally (e.g., as a database on an application processor of the accessory device, as one possibility). For example, location-assisted frequency lists including information identifying frequencies on which cells may be deployed may be available on the accessory device for each of one or more "tiles" (e.g., rectangular regions that may be 50 km×50 km, 20 km×20 km, 10 km×10 km, or any other desired dimension).

Thus, the accessory device may be able to determine its location (e.g., using a global navigational satellite system (GNSS), based on information from a recently used cellular base station or Wi-Fi access point, by tracking motion of the accessory device from a reference point using a motion processor, and/or according to any of a variety of other techniques), and may select one or more such location-assisted frequency lists associated with the current location of the accessory device as part of the cellular communication service scan. For example, a list associated with a tile in which the current location of the accessory device is located may be selected, and potentially lists for one or more tiles adjacent to the tile in which the current location of the accessory device is located may also be selected, such as any tiles within a 50 km (or 20 km, or 10 km, etc.) radius of the current location of the accessory device.

According to some embodiments, either or both of cellular communication system selection information obtained from the second device or separately obtained location based cellular communication system selection information may be filtered prior to use in the cellular communication service scan, e.g., in order to enhance the efficiency of the cellular communication scan.

For example, some or all of the candidate frequencies (e.g., including those determined from the cellular communication system selection information received from the second device and/or determined based on the location of the accessory device) may be filtered based on a preferred radio access technology (e.g., non-LTE or LTE-A frequencies may be removed, as one possibility) and/or a preferred PLMN or set of PLMNs (e.g., non home PLMN (HPLMN) or equivalent home PLMN (EHPLMN) frequencies may be removed, as one possibility), if desired.

As another possibility, some or all of the possible candidate frequencies may be filtered based on physical characteristics of the accessory device that differ from the second device. For example, as previously discussed, in some instances an accessory device may have a smaller and/or lower powered antenna arrangement than a device with which it is paired. In such cases, it may make sense to apply a signal strength threshold based filter to the list of frequencies on which the second device has previously detected cellular system information, e.g., to remove frequencies with signal strength below a signal strength threshold specific to the accessory device. For example, as one non-limiting possibility, the second device might be able to acquire a frequency with at least 103 dB RSSI, but the accessory device might require a 113 dB RSSI, and so may remove, mark as non-acceptable, and/or ignore frequencies with RSSI below 113 dB from the list of frequencies on which the second device has previously detected cellular system information rather than scanning those frequencies as part of the cellular communication service scan, at least initially. As another example, the accessory device may be technologically limited, such that it can only perform cellular communication according to certain radio access technologies (e.g., the accessory device may not support one or more older (legacy) RATs, and/or may itself be a legacy device that does not support one or more newer RATs). In such a case, candidate frequencies associated with technologies not supported by the accessory device may be filtered out based on the physical characteristics of the accessory device.

As a further consideration, if location based data is used for the cellular communication service scan, it may be useful to consider the motion state of the accessory device, as it may affect the validity of the location based data. For example, if a location based set of candidate frequencies is determined based on a current location of the accessory device at one point in time, but the accessory device is moving rapidly, that location based set of candidate frequencies may quickly become stale and result in inefficient scanning. If the accessory device is stationary or only slowly moving, such information may have a longer useful life before becoming stale. Thus, according to some embodiments, the accessory device may determine a motion state of the accessory device, e.g., using motion sensing circuitry, such as one or more accelerometers, gyroscopes, vibration sensors, and/or other motion sensing components, which may be capable of sensing motion magnitude and/or type for various types of motion. Based on the motion state, the accessory device may determine an expiration time for (or initiate a timer, or otherwise track when to discard) its location based scan list based on the motion state of the accessory device. For example, a location based scan list may be considered valid for 5 minutes in a high motion state, or 15 minutes in a moderate motion state, or an hour in a stationary or nearly stationary motion state, as one possibility. Note that these values are illustrative only, and any number of other values and motion states may be used according to various embodiments.

According to some embodiments, once a location based scan list becomes stale, if the accessory device is still out of service, a new location based scan list may be prepared. For example, a current location of the accessory device may be determined anew, and any desired candidate frequency list(s) associated with that location may be filtered using any desired filtering criteria to generate the new location based scan list.

In some embodiments, the cellular communication service scan may include multiple phases. For example, in a first phase, only a (potentially filtered) set of those frequencies on which the accessory device and/or second device has previously detected cellular communication system information, those frequencies on which neighbor cells for the accessory device and/or the second device are indicated to be deployed, and those frequencies associated with the location of the accessory device may be scanned. The first phase may last until a timer associated with the first phase expires or until cellular service is obtained. If cellular service has still not been obtained when the first phase ends, a second phase may begin in which the scan may be broadened to (e.g., also) include one or more band scans. Note that the band(s) scanned may also be filtered based on physical and/or subscription characteristics of the accessory device, if desired.

According to some embodiments, the set(s) of frequencies scanned during the first phase and/or the second phase may be ordered based on one or more considerations, e.g., to prioritize frequencies scanned for improved efficiency. For example, depending on the scan duration (e.g., length of time for which the accessory device has been out-of-service) and the motion of the accessory device while out-of-service, those frequencies selected from acquisition list database(s), neighbor list databases(s), and/or location based list database(s) of the accessory device and/or second device may be ordered depending on the relative likelihood of acquiring service from a frequency from each of those respective sources. As one possibility, during the first phase, the set may initially be ordered such that frequencies from the acquisition list database(s) are first in the order, followed by frequencies from the neighbor list database(s), further followed by frequencies from the location based list database(s). During the second phase, the set may be initially be ordered similarly, with PLMN list database(s) frequencies/bands may be appended at the end of the order. Alternatively (or in addition), the set may have a different order and/or be re-ordered depending on the circumstances of the accessory device. For example, if sufficient motion has been detected, frequencies from the location based list database(s) may be moved below frequencies/bands from the PLMN list database(s) in the scan order, e.g., since the location information based on which those frequencies were selected may no longer be relevant (or may be less relevant) due to the motion of the accessory device. Other orders and ordering algorithms are also possible.

In some embodiments, the scan may be performed over time in multiple "scan steps," which may occur periodically (e.g., every 10 s, every 20 s, every 60 s, etc.) while the accessory device is out-of-service. In each scan step, a certain (e.g., predetermined, or possibly dynamically selected) number (e.g., 5, 10, 15, etc.) of frequencies may be scanned, e.g., starting from the top of the (e.g., ordered) set of frequencies to be scanned, such that during each scan step a portion of the frequencies of the total set of frequencies may be scanned. Once all of the frequencies in the set have been scanned (and assuming service has not yet been acquired), those frequencies from the top of the set may again be scanned, and so on. If (e.g., based on device motion and/or duration of OOS) the scan set is updated and/or reordered at some point during the scan, the new set and/or order may apply beginning with the next repetition through the scan list, according to some embodiments.

Note that while a multi-phase cellular service scan may be similar in structure to a cellular service scan that might be implemented by a higher performance device (such as the second device, according to some embodiments), the relative phase lengths for the accessory device and the second device may differ. For example, the first phase (e.g., the length of time before the scan is broadened to include band scanning) may be longer for the accessory device than for the second device, e.g., since targetted scanning of those frequencies that are most likely to result in the accessory device finding cellular service, such as may occur in the first phase, may be more power efficient than broader band scans, such as may occur in the second phase, and power efficiency may be more important for the accessory device than for the second device, at least according to some embodiments.

As a still further possible consideration, the accessory device may select (or modify) its cellular communication service scan technique depending at least in part on whether the second device had cellular service when the cellular communication system selection information was received from the second device, and/or depending at least in part on what RAT the second device was using when the cellular communication system selection information was received from the second device. For example, if the second device had service and was camped on a preferred RAT (e.g., LTE, LTE-A, or any other preferred RAT), the accessory device may initially scan just those (potentially filtered) frequencies on which the second device has previously detected cellular communication system information, since in such a case it may be relatively likely that there is a good candidate cell for the accessory device among those frequencies. However, if the second device is camped on a non-preferred RAT, or does not have service, the accessory device may initially scan both those (potentially filtered) frequencies on which the second device has previously detected cellular communication system information and a (potentially filtered) set of frequencies associated with the location of the accessory device, since in such a case it may be less likely that there is a good candidate cell for the accessory device among just those frequencies on which the second device has previously detected cellular communication system information (e.g., since the second device may not have been able to obtain service according to the preferred RAT even with its potentially greater resources).

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising a processing element configured to cause an accessory device to:
   receive cellular communication system selection information from a paired device, wherein the cellular communication system selection information comprises at least information identifying a current cell and a radio access technology (RAT) on which the paired device is camped;
   store the cellular communication system selection information received from the paired device;
   determine that the accessory device has lost a pairing with the paired device;
   determine that the accessory device has lost cellular communication service; and
   perform a cellular communication service scan utilizing the cellular communication system selection information received from the paired device, wherein the cellular communication service scan is performed while the accessory device has lost the pairing with the paired device and has lost cellular communication service.

2. The apparatus of claim 1,
   wherein the information identifying the current cell comprises information indicating at least one of a cell identifier of the current cell or a frequency of the current cell.

3. The apparatus of claim 1,
   wherein the system selection information received from the paired device further comprises at least one of:
   a registered public land mobile network entry (RPLMN) for the paired device;
   a stored frequency list comprising information identifying a plurality of frequencies on which the paired device has previously detected cellular communication system information;
   a neighbor frequency list comprising information identifying a plurality of frequencies on which neighboring cells to a serving cell of the paired device are deployed; or
   a location assisted frequency list comprising information identifying a plurality of frequencies associated with a location of the paired device.

4. The apparatus of claim 1, wherein the processing element is further configured to cause the accessory device to:

filter the cellular communication system selection information from the paired device based on one or more characteristics of accessory device that differ from the paired device.

5. The apparatus of claim 4,
wherein the one or more characteristics comprise a degraded antenna performance of the accessory device relative to the paired device, wherein filtering the cellular communication system selection information comprises removing system selection candidate frequencies with signal strength below a signal strength threshold specific to the accessory device.

6. The apparatus of claim 1, wherein the processing element is further configured to cause the accessory device to:
determine a current location of the accessory device;
filter a list of frequencies associated with the current location of the accessory device based on a preferred RAT and a preferred public land mobile network (PLMN) of the accessory device; and
perform the cellular communication service scan based at least in part on the filtered list of frequencies associated with the current location of the accessory device.

7. The apparatus of claim 6, wherein the processing element is further configured to cause the accessory device to:
determine a motion state of the accessory device; and
determine an expiration time of the filtered list of frequencies associated with the current location of the accessory device based on the motion state of the accessory device.

8. The apparatus of claim 7, wherein the processing element is further configured to cause the accessory device to:
determine that the filtered list of frequencies associated with the current location of the accessory device has expired and that the accessory device has still lost cellular communication service;
determine a new current location of the accessory device;
filter a list of frequencies associated with the new current location of the accessory device based on the preferred radio access technology (RAT) and the preferred public land mobile network (PLMN); and
perform further cellular communication service scanning based at least in part on the filtered list of frequencies associated with the new current location of the accessory device.

9. The apparatus of claim 1, wherein to perform a cellular communication service scan utilizing the system selection information received from the paired device the accessory device is further configured to:
select a cellular communication service scan algorithm from at least two possible cellular communication service scan algorithms based on the RAT on which the paired device was camped.

10. The apparatus of claim 1, wherein the processing element is further configured to cause the accessory device to:
determine that a predetermined period of time has passed and the accessory device has not regained cellular communication service;
broaden the cellular communication service scan to include one or more band scans based on determining that the predetermined period of time has passed, wherein the predetermined period of time is greater than a period of time of unsuccessful cellular communication service scanning after which the paired device broadens a cellular communication service scan to include one or more band scans.

11. An accessory device, comprising:
an antenna;
a radio coupled to the antenna; and
a processing element coupled to the radio;
wherein the accessory device is configured to:
receive cellular communication system selection information from a paired device;
store the cellular communication system selection information received from the paired device;
determine that the accessory device has lost cellular communication service;
determine that the accessory device has lost a pairing with the paired device; and
perform a cellular communication service scan utilizing the cellular communication system selection information received from the paired device, wherein the cellular communication service scan is performed while the accessory device has lost the pairing with the paired device and has lost cellular communication service.

12. The accessory device of claim 11, wherein the cellular communication system selection information comprises information identifying:
a current cell on which the paired device is camped;
a radio access technology (RAT) of the current cell on which the paired device is camped;
a registered public land mobile network entry (RPLMN) for the paired device;
a plurality of frequencies on which the paired device has previously detected cellular communication system information;
a plurality of frequencies on which neighboring cells to the current cell on which the paired device is camped are deployed; and
a plurality of frequencies associated with a location of the paired device.

13. The accessory device of claim 11, wherein the accessory device is further configured to:
filter the cellular communication system selection information from the paired device based on one or more characteristics of accessory device that differ from the paired device.

14. The accessory device of claim 11, wherein the accessory device is further configured to:
determine motion information for the accessory device; and
modify the cellular communication service scan based on the motion information for the accessory device.

15. A memory medium comprising program instructions that, when executed, cause an accessory device to:
pair with a second device using a short range wireless communication technology;
receive cellular communication system selection information from the second device using the short range wireless communication technology;
store the cellular communication system selection information received from the second device;
determine that the accessory device does not have cellular communication service;
determine a current location and current motion state of the accessory device;
determine a plurality of frequencies associated with the current location of the accessory device, wherein the plurality of frequencies associated with the current location are determined based on one or more of the cellular communication system selection information received from the second device or location database information stored in a memory of the accessory device;
determine a time at which the determined plurality of frequencies associated with the current location are considered to be stale based on the current motion state of the accessory device; and
based on determining the time at which the determined plurality of frequencies associated with the current location are considered to be stale, perform a cellular communication service scan utilizing the cellular communication system selection information received from the second device.

16. The memory medium of claim 15, wherein the cellular communication system selection information comprises at least information indicating a plurality of frequencies on which the second device has previously detected cellular communication system information, wherein when executed, the program instructions further cause the accessory device to:
filter the plurality of frequencies on which the second device has previously detected cellular communication system information to remove frequencies detected with signal strength below a signal strength threshold associated with the accessory device; and
perform the cellular communication service scan utilizing the filtered plurality of frequencies on which the second device has previously detected cellular communication system information.

17. The memory medium of claim 16, wherein the cellular communication system selection information further comprises at least information indicating a radio access technology (RAT) on which the second device most recently camped, wherein when executed, the program instructions further cause the accessory device to:
initially scan just the filtered plurality of frequencies on which the second device has previously detected cellular communication system information when the RAT on which the second device most recently camped is a preferred RAT;
initially scan both the filtered plurality of frequencies on which the second device has previously detected cellular communication system information and a plurality of frequencies associated with a current location of the accessory device when the RAT on which the second device most recently camped is not a preferred RAT.

18. The memory medium of claim 15, wherein when executed, the program instructions further cause the accessory device to:
determine a set of frequencies to be scanned; and
determine a scan order for the set of frequencies to be scanned, wherein the scan order is determined based at least in part on a duration for which the accessory device has not had cellular communication service and on motion of the accessory device since the accessory device has not had cellular communication service,
wherein the cellular communication service scan utilizes the determined scan order.

19. An apparatus for configuration in an accessory device, comprising:
one or more processing elements, wherein the one or more processing elements are configured to:
receive cellular communication system selection information from a paired device;
store the cellular communication system selection information received from the paired device;
filter the cellular communication system selection information from the paired device based on one or more characteristics of accessory device that differ from the paired device;
determine that the accessory device has lost cellular communication service; and
perform a cellular communication service scan utilizing the filtered cellular communication system selection information.

20. The apparatus of claim 19, wherein the cellular communication system selection information comprises information identifying:
a current cell on which the paired device is camped;
a radio access technology (RAT) of the current cell on which the paired device is camped;
a registered public land mobile network entry (RPLMN) for the paired device;
a plurality of frequencies on which the paired device has previously detected cellular communication system information;
a plurality of frequencies on which neighboring cells to the current cell on which the paired device is camped are deployed; and
a plurality of frequencies associated with a location of the paired device.

21. The apparatus device of claim 19, wherein the one or more processing elements are further configured to:
determine motion information for the accessory device; and
modify the cellular communication service scan based on the motion information for the accessory device.

22. A memory medium comprising program instructions that, when executed, cause an accessory device to:
pair with a second device using a short range wireless communication technology;
receive cellular communication system selection information from the second device using the short range wireless communication technology;
store the cellular communication system selection information received from the second device;
determine that the accessory device does not have cellular communication service;
determine a set of frequencies to be scanned; and
determine a scan order for the set of frequencies to be scanned, wherein the scan order is determined based at least in part on a duration for which the accessory device has not had cellular communication service and on motion of the accessory device since the accessory device has not had cellular communication service;
perform a cellular communication service scan utilizing the cellular communication system selection information received from the second device, wherein the cellular communication service scan utilizes the determined scan order.

23. The memory medium of claim 22, wherein the cellular communication system selection information comprises at least information indicating a plurality of frequencies on which the second device has previously detected cellular communication system information, wherein when executed, the program instructions further cause the accessory device to:
filter the plurality of frequencies on which the second device has previously detected cellular communication system information to remove frequencies detected with signal strength below a signal strength threshold associated with the accessory device; and perform the cellular communication service scan utilizing the filtered plurality of frequencies on which the second device has previously detected cellular communication system information.

24. The memory medium of claim 23, wherein the cellular communication system selection information further comprises at least information indicating a radio access technology (RAT) on which the second device most recently camped, wherein when executed, the program instructions further cause the accessory device to:

initially scan just the filtered plurality of frequencies on which the second device has previously detected cellular communication system information when the RAT on which the second device most recently camped is a preferred RAT;

initially scan both the filtered plurality of frequencies on which the second device has previously detected cellular communication system information and a plurality of frequencies associated with a current location of the accessory device when the RAT on which the second device most recently camped is not a preferred RAT.

* * * * *